(12) United States Patent
Cook et al.

(10) Patent No.: US 6,292,462 B1
(45) Date of Patent: Sep. 18, 2001

(54) MULTICARRIER MODULATION

(75) Inventors: John W Cook, Ipswich; Robert H Kirkby, Woodbridge, both of (GB)

(73) Assignee: British Telecommunications plc, London (GB)

( * ) Notice: Subject to any disclaimer, the term of this patent is extended or adjusted under 35 U.S.C. 154(b) by 0 days.

(21) Appl. No.: 09/043,291
(22) PCT Filed: Oct. 7, 1996
(86) PCT No.: PCT/GB96/02445
  § 371 Date: Mar. 24, 1998
  § 102(e) Date: Mar. 24, 1998
(87) PCT Pub. No.: WO97/13350
  PCT Pub. Date: Apr. 10, 1997

(30) Foreign Application Priority Data

Oct. 5, 1995 (GB) .................................................. 9520306
Apr. 22, 1996 (GB) .................................................. 9608274

(51) Int. Cl.[7] .............................. H04J 11/00; H04J 5/12; H04J 23/02
(52) U.S. Cl. ........................................... 370/210; 375/261
(58) Field of Search .................................... 370/203, 204, 370/206, 207, 208, 210; 375/260, 261

(56) References Cited

U.S. PATENT DOCUMENTS

| | | | |
|---|---|---|---|
| 5,307,376 | 4/1994 | Castelain et al. | 375/260 |
| 5,357,502 | 10/1994 | Castelain et al. | 370/210 |
| 5,596,604 | * 1/1997 | Cioffi et al. | 375/260 |
| 5,729,570 | * 3/1998 | Magill | 375/206 |
| 5,732,113 | * 3/1998 | Schmidl et al. | 375/355 |

FOREIGN PATENT DOCUMENTS

| | | |
|---|---|---|
| 0441732 A1 | 8/1991 | (EP) . |
| 0499560 A1 | 8/1992 | (EP) . |
| 0613267 A2 | 8/1994 | (EP) . |
| WO 96/13918 | 5/1996 | (WO) . |

OTHER PUBLICATIONS

Gunther et al, "DOQPSK—Differential Demodulation of Filtered Offset QPSK", 44th IEEE Vehicular Technology Conference, Jun. 8–10, 1994, Stockholm, Sweden, pp. 1542–1546, XP000497680.
Li et al., "Waveform Shaped MCM for Digital Microwave Radio", Proceedings of the International Conference on Communications, Jun. 18–22, 1995, New York, US, pp. 1695–1699, XP000535043.
Filege, "Orthogonal Multiple Carrier Data Transmission", European Transactions on Telecommunications and Related Technologies, vol. 3, no. 3, Milano, Italy, pp.255–264, XP000304924 May 1992 (No Day).
Chaffee, "Multicarrier Staggered Modulation", Feb. 5, 1992.
Sandberg et al, "Overlapped Discrete Multitone for High Speed Copper Wire Communications", IEEE Journal on Selected Areas in Communications, vol. 13, No. 9, Dec. 1995, pp. 1571–1585.

* cited by examiner

Primary Examiner—Huy D. Vu
Assistant Examiner—Kevin C. Harper
(74) Attorney, Agent, or Firm—Nixon & Vanderhye P.C.

(57) ABSTRACT

Multiple carriers are generated, modulated by data to be transmitted, as shown by oscillators and modulators (or using Fourier transform techniques). They follow two paths. One path via an adder takes a set of carriers at integer multiples of a windowing frequency where the odd carriers have some reference phase and the even carriers are in phase quadrature. The other path via an adder takes a second set of carriers, again at integer multiples of the windowing frequency. The even carriers have a reference phase and the odd carriers are in phase quadrature therewith. In the first path, the signal is multiplied by a windowing function with a period equal to the reciprocal of the windowing frequency. In the second path, the signal is multiplied by a similar function which is time-shifted (by a delay) by half of the period.

11 Claims, 6 Drawing Sheets

MULTICARRIER MODULATION

BACKGROUND OF THE INVENTION

1. Field of the Invention

This application is concerned with multicarrier modulation techniques, which serve to transport information over a communications channel by modulating the information on a number of carriers, typically known as sub-channels.

2. Description of Related Art

Of particular interest are discrete systems where, rather than modulating a carrier with a continuously variable information signal, successive time periods ("symbols") of the carrier each serve to transmit one piece of information; that, is, the information does not vary during the course of a symbol.

Of the most practical interest is the situation where the information to be sent is in digital form, so that each symbol serves to transport a number of bits, but this is not in principle necessary and sampled analog signals could be sent—i.e. the information signal is quantized in time but may or may not be quantized in amplitude.

Quadrature modulation may if desired be used, where both the phase and amplitude of the carrier are varied, or (which amounts to the same thing) two carriers at the same frequency but in phase quadrature may each be modulated independently. A "multicarrier symbol" may thus consist of a time period during which are transmitted (say) 256 carries at different frequencies plus 256 carriers at the same set of frequencies but in phase quadrature. For digital transmission, up to 512 groups of bits may be modulated onto these carriers. Normally the carriers are harmonically related, being integer multiples of the symbol rate. This form of modulation is particularly attractive for use on poor quality transmission paths, since the number of bits allocated to each carrier can be tailored to the characteristics of the path, and indeed carriers may be omitted in parts of the frequency spectrum in which quality is especially poor.

The number of bits sent on each sub-channel may if desired be varied adaptively depending on the signal and noise levels in each sub-channel. This can be a particular advantage for transmission paths which suffer crosstalk or radio frequency interference, since the system can adapt automatically to avoid regions of frequency spectrum that are unsuitable for data transmission.

Multicarrier modulation has been standardized for use on copper pair links in a form known as discrete multitone (DMT) modulation. This is described in the technical literature (see, e.g. "Multicarrier Modulation for Data Transmission: an Idea whose Time has come", J. A. C. Bingham, IEEE Comms. Magazine, May 1990, pp. 5–14) and in a draft ANSI standard (T1E1.4/94-007) for asymmetrical digital subscriber loop technology. It is also of interest for use at higher rates than specified in the standard for use over shorter paths.

The systems referred to above may simply output successive symbols continuously to line, as illustrated in FIG. 1A; the effect of the modulation on the frequency spectrum of the output is that of a rectangular window and causes spreading (according to a sinc function) of the subchannel energy into the regions occupied by adjacent subchannels. However if the carriers are harmonically related to the reciprocal of the receiver's window durations the zero-crossings of the sinc function lie at the adjacent carrier frequencies and inter-subchannel crosstalk is avoided.

Of concern with transmission by these type of modulation over cables such as twisted pair copper is the impact of narrowband interference, especially when using a large total bandwidth (e.g. up to 10 MHz). For example, cable terminations to domestic premises may collect interference from nearby amateur radio stations (in the UK there are three amateur radio bands within the range 1–10 MHz). Of equal concern is the radiation of interference by the multicarrier transmission.

As mentioned earlier, these problems can be mitigated by not using those subchannels that are at frequencies known to lie within a band where problems of this kind occur or are expected to occur. However the improvement obtained is limited because there will still be some radiation in the band from subchannels lying outside the band, due to the spreading referred to above, and similarly receivers decoding those adjacent channels have to pick up this energy and will thus pick up some interference from the band of concern. The sinc function implies that the roll-off of amplitude as one moves away from the carrier is proportional to the reciprocal of the frequency offset.

One aim of the present invention, at least in its specific embodiments, is to alleviate this problem.

BRIEF DESCRIPTION OF THE DRAWINGS

Some embodiments of the invention will now be described, by way of example, with reference to the accompanying drawings, in which.

Multicarrier modulation systems can be achieved using a parallel bank of modulators (in the transmitter) or demodulators (at a receiver). Alternatively (and preferably) modern digital signal processing techniques can be used by using an inverse fast Fourier transform to transform data to be transmitted from the frequency domain to the time domain. However the parallel method will be described first.

Figure 1A:
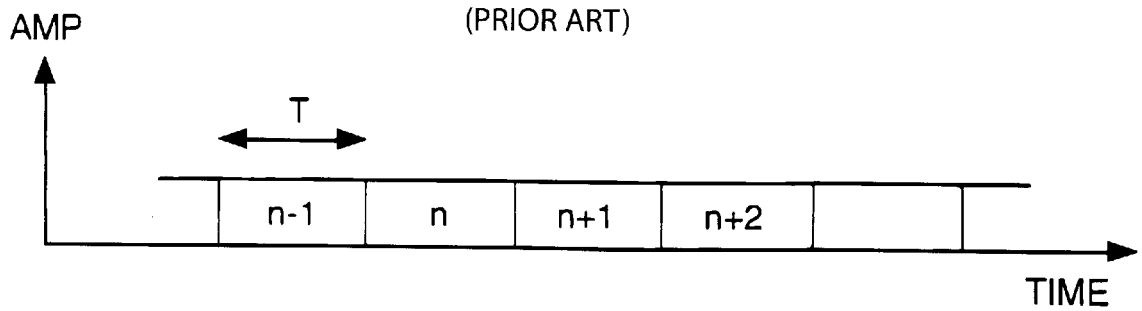
FIGS. 1A and 1B are timing diagrams illustrative of the prior art.
Figure 1B:
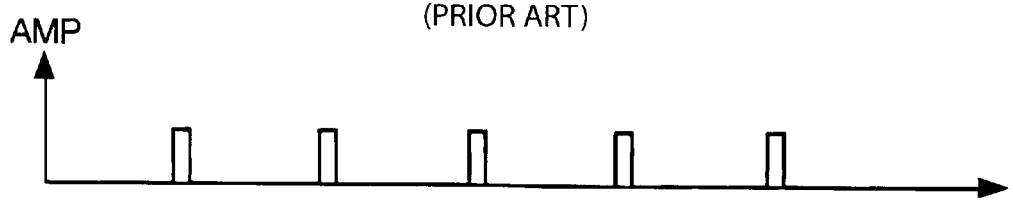
Figure 2:
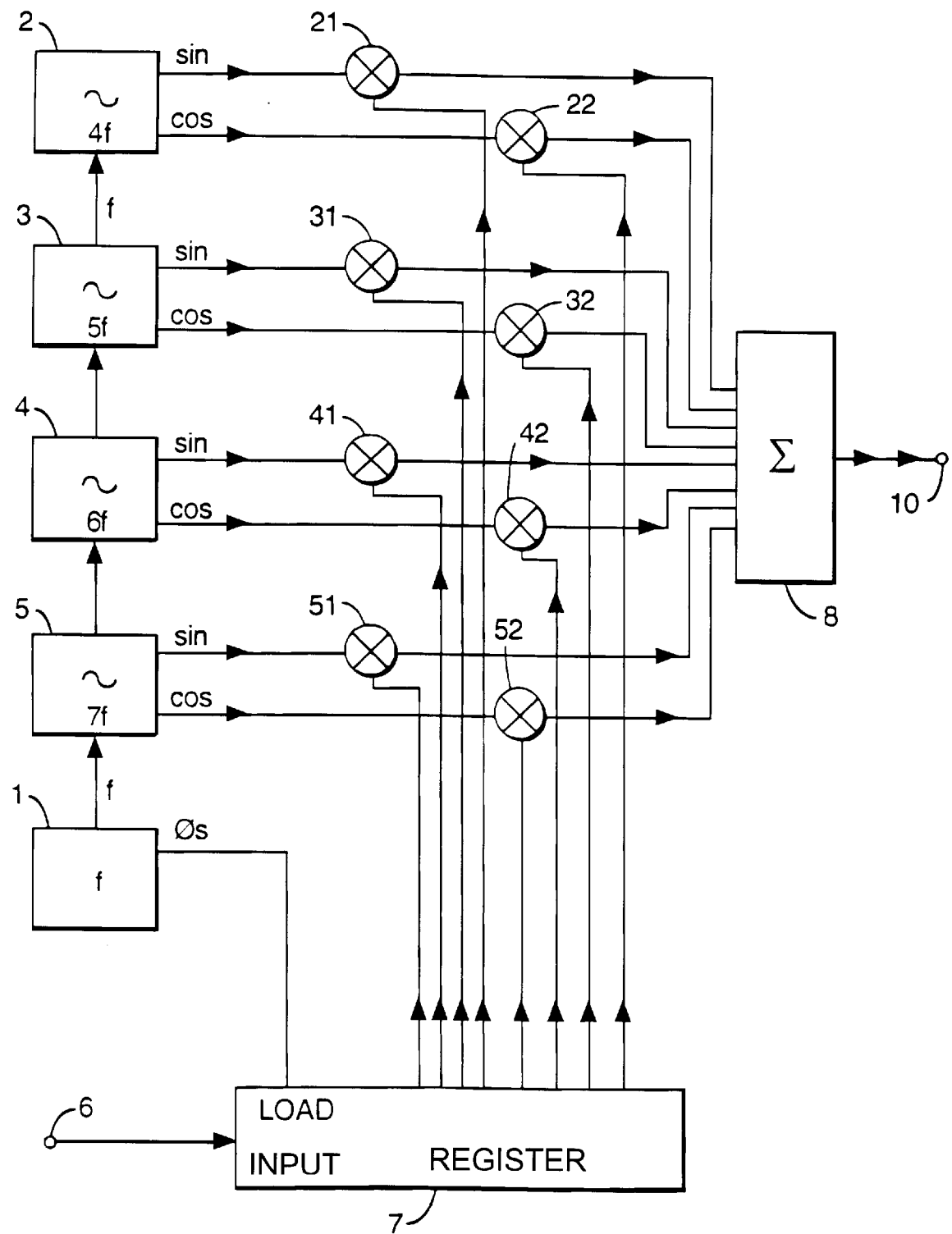
FIG. 2 is a block diagram of a known transmitter.

FIG. 2 shows a transmitter for a conventional system having four subchannels (though more would be used in practice). A clock generator 1 produces symbol rate pulses $\phi_s$ (FIG. 1B) at a frequency f (period T=1/f) and also a reference sinusoidal output at this frequency (i.e. sin 2 πft), whilst four carrier oscillators 2–5 produce in-phase and quadrature carriers locked to the reference sinusoid at (e.g.) 4f, 5f, 6f and 7f: i.e.

sin 8πft cos 8πft sin 10πft cos 10πft sin 12πft cos 12πft sin 14πft cos 14πft

All these nine signals are synchronous and could in practice be generated by a frequency synthesizer; separate oscillators are shown for clarity. Digital data to be transmitted are received at an input 6 and loaded into a register 7 under control of the symbol rate pulses $\phi_s$ so that a group of bits is available for the duration of one multicarrier symbol.

The two outputs of each oscillator 2, 3, 4, 5 are connected to a pair of modulators 21, 22, 31, 32 etc. Each modulator is assumed to receive an allocated number of bits from the register 7 so that the amplitude of its output is proportional to a digital value represented by those bits; however as mentioned earlier, they could equally well be fed with sampled analog outputs.

The outputs of the eight modulators are added together in an adder 8 to form a multicarrier symbol and then pass to an output 10.

Although no window is explicitly applied, the fact that the data change at intervals of T means that implicitly the signal is divided into successive symbol periods by rectangular windows. We note that the frequency spectrum due to the rectangular window is $$\frac{\sin(\pi \Delta f \tau)}{\pi \Delta f}$$

where τ is the duration of the window and Δf is the frequency deviation from the nominal carrier frequency.

Figure 3:
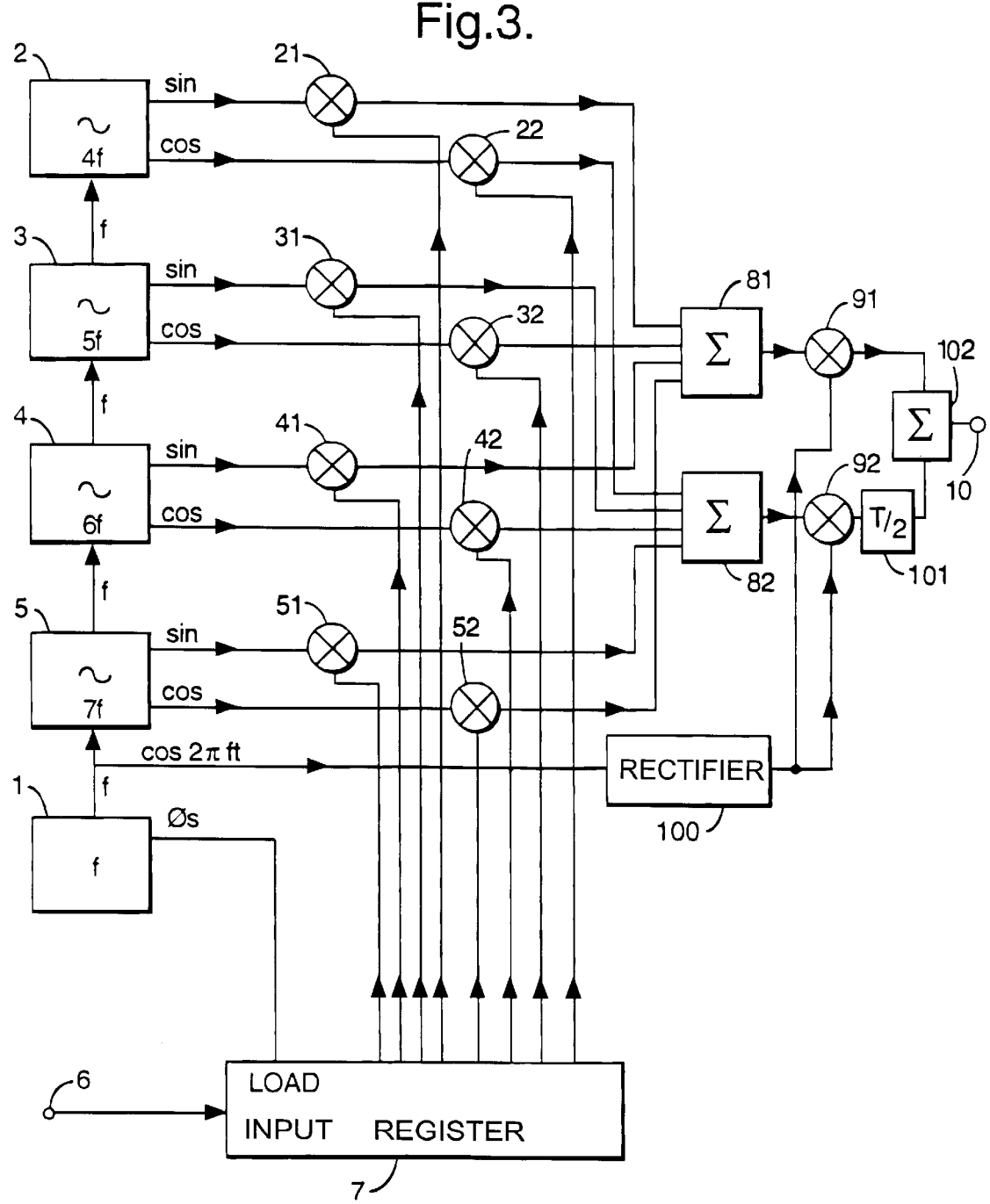
FIG. 3 is a block diagram of a transmitter according to one embodiment of the invention.

FIG. 3 shows a transmitter according to a first embodiment of the invention. Again it has the clock generator 1 producing symbol pulses $\phi_s$, the four oscillators 2–5, the eight modulators 21, 22, 31, 32 etc., the register 7 which receives digital data at input 6 and output 10.

The first difference from FIG. 2 is that a different window function is used.

This is a half cosine, i.e., referred to a time origin at the center,

=cos(πt/T) |t|<$_T$/2

=O |t|>$_T$/2

Figure 1C:

Of course, this windowing function is generated repeatedly (as shown in FIG. 1C) and may be expressed as W=|sin(πft)| with time measured from the beginning of the window.

Note that it is not necessary that this is in phase with the carriers; it is however necessary that the "sin" carriers all have the same phase (or are in antiphase) at the start of the window and that the "cos" carriers likewise have the same phase as one another at that point.

This shape of window function has a frequency spectrum of $$\frac{T}{2}\left(\frac{\sin\pi(\Delta fT - 1/2)}{\pi(\Delta fT - 1/2)} + \frac{\sin\pi(\Delta fT + 1/2)}{\pi(\Delta fT + 1/2)}\right)$$

The window function is explicitly generated from the sinusoid by taking the modulus, e.g. with a full-wave rectifier 100.

While this has a broader central peak, it has a steeper roll-off as one moves away from the carrier center frequency.

Unfortunately, although this window improves the spectral characteristics of the signal, it results in crosstalk between individual subchannels within a symbol—e.g. between the modulated carriers at sin 8πft and sin 10πft.

We have found that this crosstalk can be alleviated by shifting the windowing waveform applied to alternate sine carriers by a time T/2.

The same expedient of course also works for the cosine carriers, but to avoid crosstalk between (say) the sin 8πft and cos 10πft subchannels one proceeds as follows.

(a) for carriers at frequencies which are an even multiple of the fundamental f, the shifted window is applied to the cosine carriers only;

(b) for carriers at frequencies which are an odd multiple of the fundamental f, the shifted window is applied to the sine carriers only.

This statement is also true if the words "odd" and "even" are switched.

Thus, in FIG. 3, the outputs of the modulators 21, 32, 41, 52 are supplied to a first adder 81 and the outputs of modulators 22, 31, 42, 51 are conducted to a second adder 82.

The output of the adder 81 is multiplied in a modulator 91 by the window function W while the output of the adder 82 is multiplied in a modulator 92 by the window function W. The window function for the modulator 92 needs to be delayed by T/2. In the arrangement in FIG. 3, the relevant data also needs to be time shifted to align with the shifted window; also the carriers must be shifted to preserve the required phase relationship. Thus the output of the modulator 92 is delayed by T/2(=1/2f) in a delay line 101, thereby effectively delaying all three quantities. The outputs of the modulator 91 and the delay line 101 are added in an adder 102 and the sum supplied to the output 10.

Figure 4:
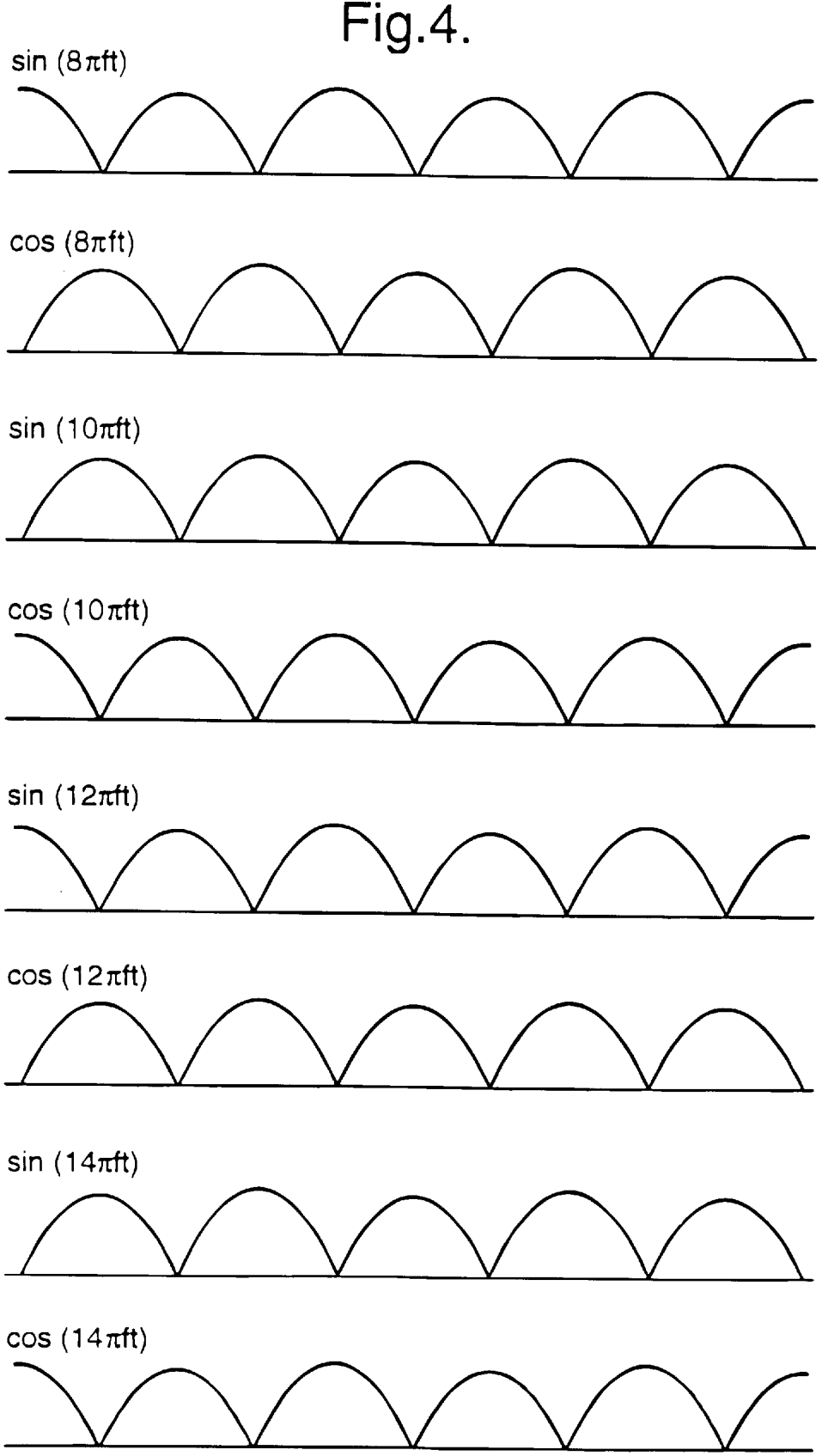
FIG. 4 shows graphically some windowing waveforms used in the apparatus of FIG. 3.

As a result of this process, the output obtained is the sum of eight components as shown in FIG. 4 where we see eight window functions each marked with the frequency and phase of the carrier components modulated by them. Note that sin and cos in this Figure refer to time references at the start of one of the relevant windows; in a radio frequency system in which positive and negative frequencies are distinct all the carriers may be given an arbitrary phase shift, provided that this is the same phase angle for each carrier.

The content of the generated signal may be expressed mathematically, for a generalized number of carriers, as:

$$\sum_{i=1}^{I} a(n_i) + \sum_{j=1}^{J} b(m_j)$$

where $a(n_i)=d_1 \cdot |\sin(\pi ft)| \cdot \sin(2\pi n_i ft + \psi) + d_4 \cdot |\cos(\pi ft)| \cdot \cos(2\pi n_i ft + \psi)$ $b(m_j)=d_3 \cdot |\cos(\pi ft)| \cdot \sin(2\pi m_j ft + \psi) + d_2 \cdot |\sin(\pi ft)| \cdot \cos(2\pi m_j ft + \psi)$ $n_i$ (i=1, . . I) are a set of mutually different odd positive integers $m_j$ (j=1, . . J) are a set of mutually different even positive integers greater than unity.

f is a base frequency

ψ is a constant phase value t is time

I is the number of carrier frequencies having a frequency which is an odd multiple of the base frequency f;

J is the number of carrier frequencies having a frequency which is an even multiple of the base frequency f;

$d_1, d_2, d_3$ and $d_4$ are values to be transmitted, where these data values may be different for different carrier frequencies and for different symbols, a symbol being the period between, for $d_1$ and $d_2$, consecutive zero values of $\sin(\pi ft)$ and, for $d_3$ and $d_4$, consecutive zero values of $\cos(\pi ft)$.

Note however that some of these components may be omitted—e.g. all the cosine terms.

If preferred, the frequencies used may instead of being integer multiples of f, be subject to a frequency offset. Thus $n_i$ and $m_j$ in the above relations may be replaced by $(n_i+\phi)$ and $(m_j+\phi)$ where $\phi$ is a constant shift value. In a radio frequency system where positive and negative frequencies are distinct, $\phi$ may take any value, but in baseband systems orthogonality will not be preserved unless $\phi=0$ or $\phi=1/2$.

$m_j$ above is stated to be greater than unity; however, where $\phi=0$, a d.c. term $d_5 |\sin \pi ft|$ or $d_5 |\cos \pi ft|$ (but not of course both) may also be added, where $d_5$ are data values which may be different for different symbols ( a symbol being the period between consecutive zero values of $\sin \pi ft$ or of $\cos \pi ft$ respectively). When $\psi=0$, $\psi$ may have the value 0, $\pi/2$, $\pi$ or $3\pi/2$.

Where $\phi=1/2$ then the set of $m_j$ may include zero. $\phi$ may have the value $\pi/4$, $3\pi/4$, $5\pi/4$ or $7\pi/4$.

To obtain this offset in FIG. 3, it is necessary simply that the oscillators generate the appropriate frequencies—e.g. 4½f, 5½f, 6½f, 7½f.

Figure 5:
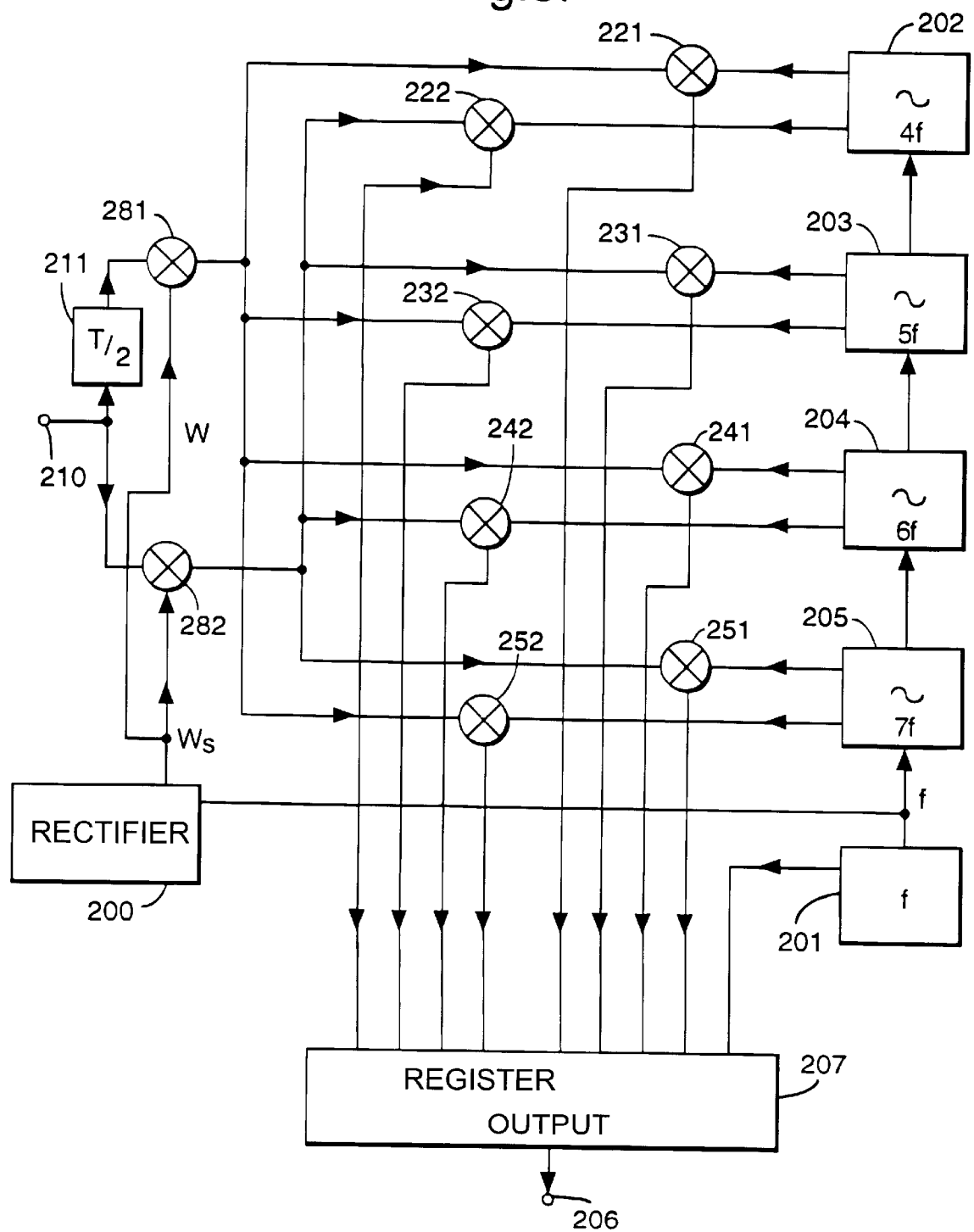
FIG. 5 is a block diagram of a receiver for use with the transmitter of FIG. 3.

FIG. 5 shows a suitable receiver for use with the transmitter of FIG. 3. Signals received at an input 210 divide into two paths one of which is delayed in a delay line 211 by T/2; the delayed and undelayed signals are multiplied by the window function W identical to that at the transmitter, in multipliers 281, 282 respectively. Synchronous demodulators are formed by multipliers 221, 222, 231, etc. driven by oscillators 202–205 producing identical signals to the oscillators 2–5 at the transmitter. The connections from the multipliers 281, 282 are analogous to the corresponding connections at the transmitter, viz. the multiplier 281 feeds synchronous modulators 221, 232, 241, 252 while the multiplier 282 feeds synchronous demodulators 222, 231, 242, 251. The demodulated outputs are supplied to a register 207 whence they are available at an output 206. Units 200, 201, 211 perform the same function as units 100, 1, 101 at the transmitter; the clock generator 201 and oscillators 202–205 being locked to the incoming signal by conventional synchronisation arrangements (not shown).

Figure 6:
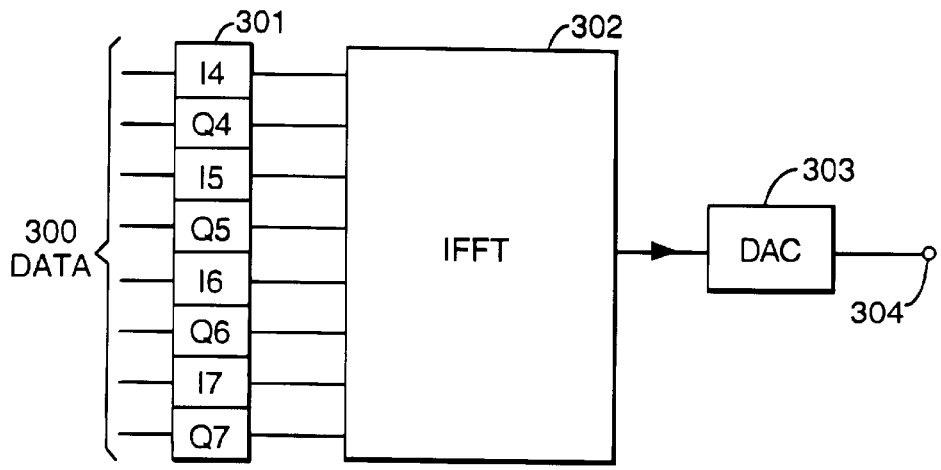
FIG. 6 illustrates a known transmitter using Fourier transform techniques.

FIG. 6 shows a conventional multicarrier transmitter implementation using fast Fourier transform techniques. Data bits at an input 300 appear (with a new set of bits at intervals of T) in a register 301 where a first group of bits I4 is considered to represent the in-phase or real component of a carrier at frequency 4½f and a second group of bits to represent the quadrature or imaginary component Q4. Further such groups are labelled I5, Q5, I6, Q6, I7 and Q7 to indicate real and imaginary components of carriers at 5f, 6f and 7f. As mentioned above, normally there would be many more carriers than this. These bits are viewed as a frequency domain representation of the desired signal and processed in a processing unit 302 which applies the inverse FFT to produce an output consisting of digital signal samples representing the desired output waveform in the time domain, which are then converted into analogue form and fed to an output 304.

Figure 7:
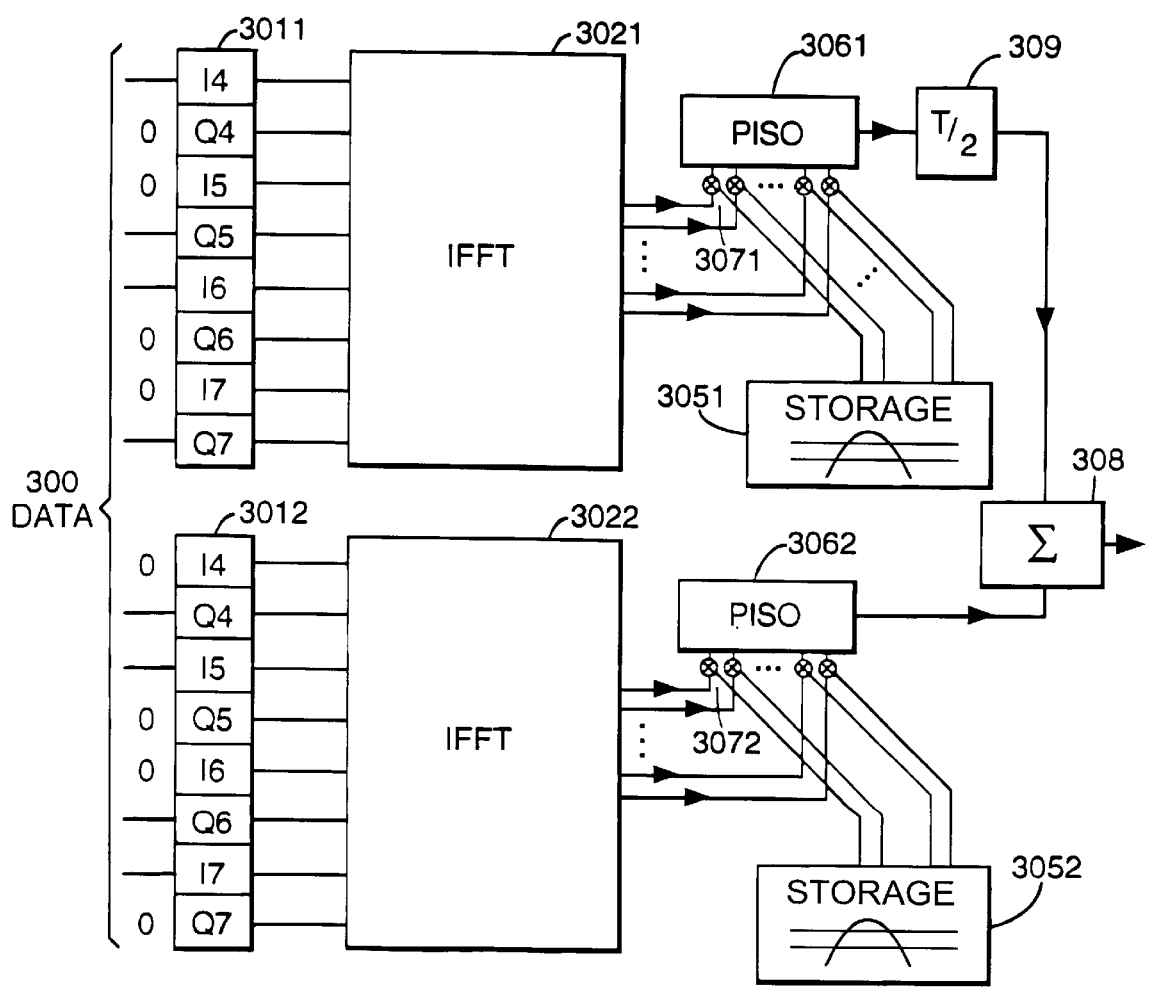
FIG. 7 is a block diagram of a transmitter according to a second embodiment of the invention.

FIG. 7 shows an FFT scheme according to a second embodiment of the present invention, in which the data input at 300 are divided between two registers 3011, 3012. The register 3011 takes data bits only for the real components of the even carriers and for the quadrature components of the odd carriers—i.e. I4, Q5, I6 and Q7. The other register fields Q4, I5, Q6 and I7 are permanently held at zero. These fields are fed to a first IFFT processor 3021 whose parallel signal outputs for one symbol are multiplied by coefficients (being the values of the window function W defined earlier) from a store 3051 in multipliers 3071 and these samples converted into serial form in a parallel-in serial-out register (PISO) 3061.

A second register 3012 and IFFT unit 3022, with store 3052, PISO 3062, and multipliers 3072 are provided and operate in the same way except that only those input fields Q4, I5, Q6 and I7 which were held at zero now receive data bits, and the others I4, Q5, I6 and Q7 are now held at zero. The outputs of the two PISO registers 3061, 3062 are added together in an adder 308 after one (3061, as shown) has been delayed in a delay line 309 by T/2.

Although the above description of both the discrete and FFT versions have been described on the assumption that each modulating value (which, it may be noted, may assume both positive and negative values) may be represented by a group of bits—or indeed a continuous function, it is possible to use only one bit for each. In this case the system may be realized as a bank of MSK (minimum shift keying) transmitters; provided however that transmitters running at frequencies which are odd multiples of the base frequency are run with carriers 90 degrees out of phase from the even ones.

Referring back to FIG. 3, it may be noted that the effect of the delay 101 may be realized by separate delays on the data, the carriers and the window function. This would have the advantage of permitting half the data to arrive later at the input register 7. Similar comments apply to the receiver of FIG. 5.

In the transmitter of FIG. 7, a frequency offset $\phi$ (as discussed in relation to FIG. 3) can be provided by providing frequency changers at the outputs of the IFFT units 3021, 3022, for example by means of a multiplier receiving a complex output from the IFFT unit (only the real output being shown in FIG. 7) and multiplying by $(\cos 2\pi\phi ft + i \sin 2\pi\phi ft)$.

What is claimed is:

1. A method of transmitting signal values comprising generating an output signal which is the sum of:

(a) a first signal component which is the product of a first periodic window function and the sum of first carriers and second carriers, the first periodic window function dividing the first signal component into successive first symbol periods, wherein the first carriers have mutually different frequencies which differ from one another by even integer multiples of a base frequency which is the reciprocal of the symbol period and have a first phase, the second carriers have mutually different frequencies which differ from one another by even integer multiples of the base frequency and differ from the first carriers by odd integer multiples of the base frequency and are in phase quadrature to the first carriers, each of the first and second carriers being modulated during each of the first symbol periods with a respective one of the signal values;

(b) a second signal component which is the product of a second periodic window function and the sum of third carriers and fourth carriers, the second periodic window function dividing the second signal component into successive second symbol periods, wherein the second periodic window function is identical to the first periodic window function but shifted in time by half a symbol period such that the second symbol periods are shifted in time by half a symbol period relative to the first symbol periods, the third carriers have mutually different frequencies which differ from one another by even integer multiples of the base frequency and differ from the first carriers by odd integer multiples of the base frequency and have the first phase, and the fourth carriers have mutually different frequencies which differ from one another by even integer multiples of the base frequency and differ from the first carriers by zero or even integer multiples of the base frequency and are in phase quadrature to the first carriers, each of the third and fourth carriers being modulated during each of the second symbol periods with a respective one of the signal values.

2. A method of transmitting signal values comprising generating an output signal which is the sum of:

(a) a first signal component which is the product of a first periodic window function and the sum of first carriers, the first periodic window function dividing the first signal component into successive first symbol periods, wherein the first carriers have mutually different frequencies which differ from one another by even integer multiples of a base frequency which is the reciprocal of the symbol period and have a first phase, each of the first carriers being modulated during each of the first symbol periods with a respective one of the signal values;

(b) a second signal component which is the product of a second periodic window function and the sum of further carriers, the second periodic window function dividing the second signal component into successive second symbol periods, wherein the second periodic window function is identical to the first window function but shifted in time by half a symbol period such that the second symbol periods are shifted in time by half a symbol period relative to the first symbol periods, the further carriers have mutually different frequencies which differ from one another by even integer multiples of the base frequency and differ from the first carriers by odd integer multiples of the base frequency and have the first phase, each of the further carriers being modulated during each of the second symbol periods with a respective one of the signal values.

3. A method comprising.

generating a multicarrier output signal, content of said generated output signal being defined by:

$$\sum_{i=1}^{I} a(n_i) + \sum_{j=1}^{J} b(m_j)$$

where $a(n_i)=d_1 \cdot |\sin(\pi ft)| \cdot \sin(2\pi(n_i+\phi)ft+\psi)+d_4 \cdot |\cos(\pi ft)| \cdot \cos(2\pi(n_i+\phi)ft+\psi)$;

$b(m_j)=d_3 \cdot |\cos(\pi ft)| \cdot \sin(2\pi(m_j+\phi)ft+\psi)+d_2 \cdot \sin(\pi ft)| \cdot \cos(2\pi(m_j+\phi)ft+\psi)$;

$n_i(i=1, \ldots I)$ are a set of mutually different odd positive integers;

$m_j(j=1, \ldots J)$ are a set of mutually different even positive integers;

f is a base frequency;

$\phi$ is a constant representing a frequency offset;

$\psi$ is a constant phase value;

t is time;

I is the number of carrier frequencies having a frequency $(n_i+\phi)f$;

J is the number of carrier frequencies having a frequency $(m_j+\phi)f$;

$d_1, d_2, d_3$ and $d_4$ are values to be transmitted, where these data values may be different carrier frequencies and for different symbols, a symbol being the period between, for $d_1$ and $d_2$, consecutive zero values of $\sin(\pi ft)$ and, for $d_3$ and $d_4$, consecutive zero values of $\cos(\pi ft)$; and transmitting signal values based on said generated output signal to a communications medium.

4. A method according to claim 3 in which the frequency offset ($\phi$) is zero.

5. A method according to claim 4 in which $m_i$ are nonzero and the signal additionally includes a term $d_5|\sin \pi ft|$ or $d_5|\cos \pi ft|$, where $d_5$ are further values to be transmitted and may be different for different symbols, a symbol being the period between consecutive zero values of $\sin(\pi ft)$ or $\cos(\pi ft)$ respectively.

6. A method according to claim 4 in which $\psi$ is one of the values 0, $\pi/2$, $\pi$, $3\pi/2$.

7. A method according to claim 3 in which the frequency offset ($\phi$) is ½.

8. A method according to claim 7 in which the set $m_i$ includes $m_j=0$.

9. A method according to claim 7 in which $\psi$ is one of the values $\pi/4$, $3\pi/4$, $5\pi/4$ or $7\pi/4$.

10. A method comprising.

generating a multicarrier output signal, content of said generated signal being defined by:

$$\sum_{i=1}^{I} a(n_i) + \sum_{j=1}^{J} b(m_j)$$

where $a(n_i)=d(N_a(I+J)+i) \cdot |\sin(\pi ft)| \cdot \sin(2\pi n_i ft+\psi)$ $b(m_j)=d(N_a(I+J)+j) \cdot |\cos(\pi ft)| \cdot \cos(2\pi m_j t+\psi)$ $n_i(i=1, \ldots I)$ are a set of odd positive integers greater than unity;

$m_j(j=1, \ldots J)$ are a set of even positive integers greater than unity;

f is a base frequency;

t is time;

I is the number of carrier frequencies having a frequency which is an odd multiple of the base frequency f;

d(k) are a set of values to be transmitted; and $N_a$ and $N_b$ are symbol numbers which are incremented at each zero value of respectively $\sin(\pi ft)$ or $\cos(\pi ft)$; and transmitting signal values based on said generated output signal to a communications medium.

11. An apparatus for transmitting signal values comprising:

(a) means for generating a signal having first frequency components and second frequency components, modulated by ones of said values, wherein (i) the first frequency components differ from one another by even integer multiples of a base frequency;

(ii) the first frequency components have a first phase;

(iii) the second frequency components differ from one another by even integer multiples of the base frequency;

(iv) the second frequency components differ from the first components by odd integer multiples of the base frequency; and (v) the second frequency components are in phase quadrature to the first frequency components;

(b) means for generating a signal having third frequency components and fourth frequency components, modulated by further ones of said values, wherein (i) the third frequency components differ from one another by even integer multiples of the base frequency;
(ii) the third frequency components differ from the first components by odd integer multiples of the base frequency;
(iii) the third frequency components have the first phase;
(iv) the fourth frequency components differ from one another by even integer multiples of the base frequency;
(v) the fourth frequency components differ from the first components by zero or even integer multiples of the base frequency; and
(vi) the fourth frequency components are in phase quadrature to the first frequency components;

(c) means for multiplying the signal having the first and second frequency components by a first periodic window function which has a period equal to the reciprocal of the base frequency;

(d) means for multiplying the signal having the third and fourth frequency components by a second periodic window function which is identical to the first periodic window function but is time-shifted relative to the first window function by a delay equal to half of the said period; and (e) means for adding the outputs of the multiplying means.

* * * * *